June 26, 1934.  W. C. NIDEVER ET AL  1,964,270
MEANS FOR SAMPLING LIQUIDS
Filed Dec. 12, 1930   2 Sheets-Sheet 1
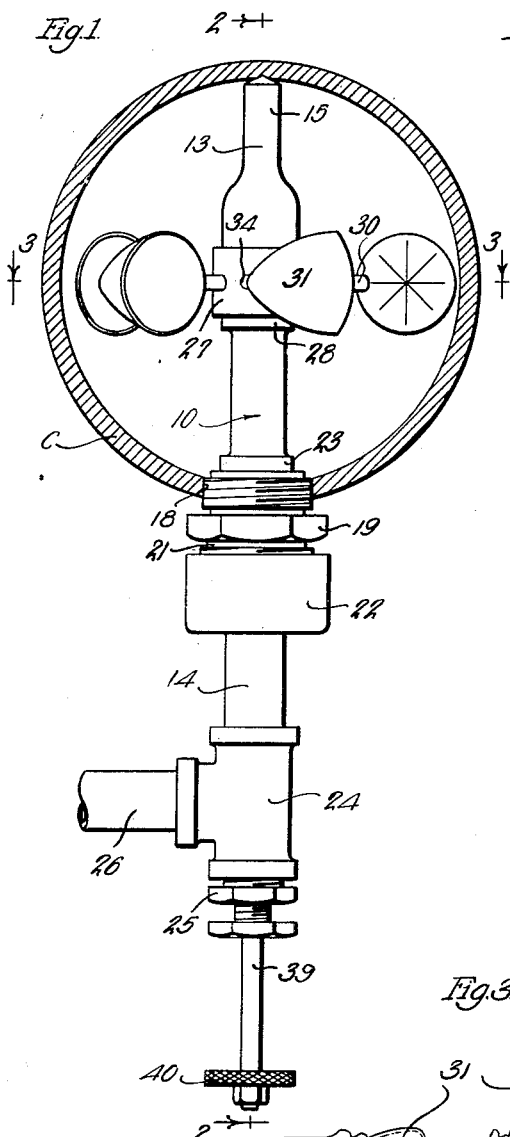
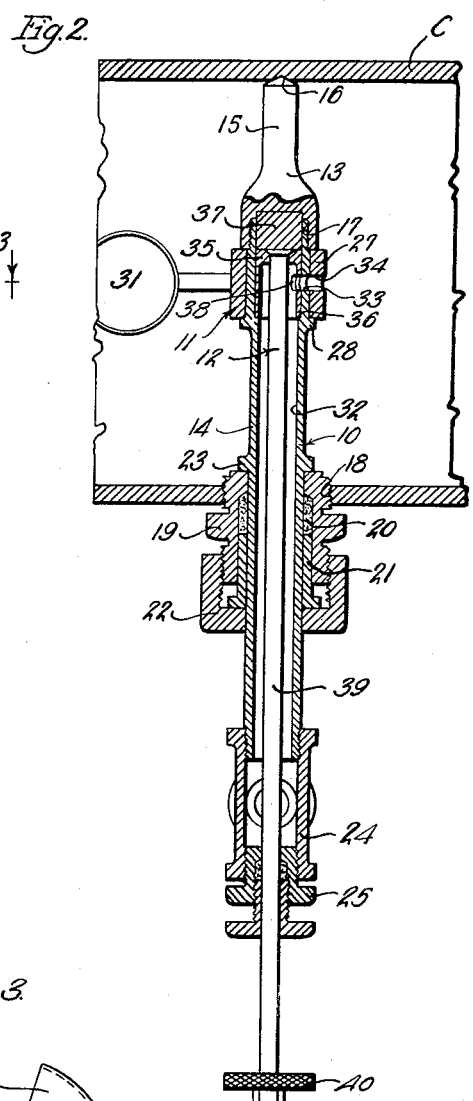
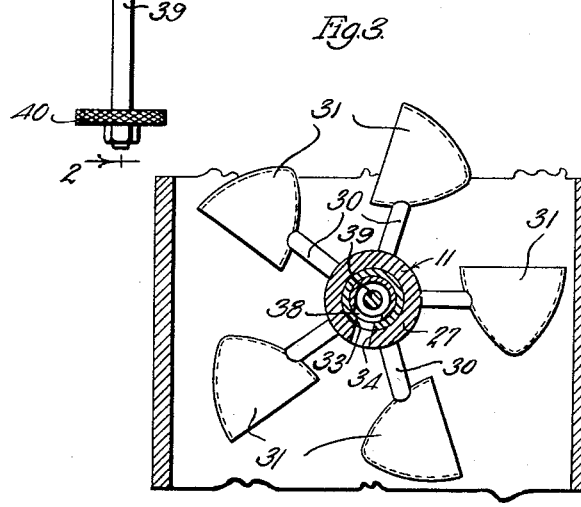
Inventors
WALLACE C. NIDEVER
and EARL ARMBRUSTER
by
Their Attorney June 26, 1934.  W. C. NIDEVER ET AL  1,964,270
MEANS FOR SAMPLING LIQUIDS
Filed Dec. 12, 1930   2 Sheets-Sheet 2
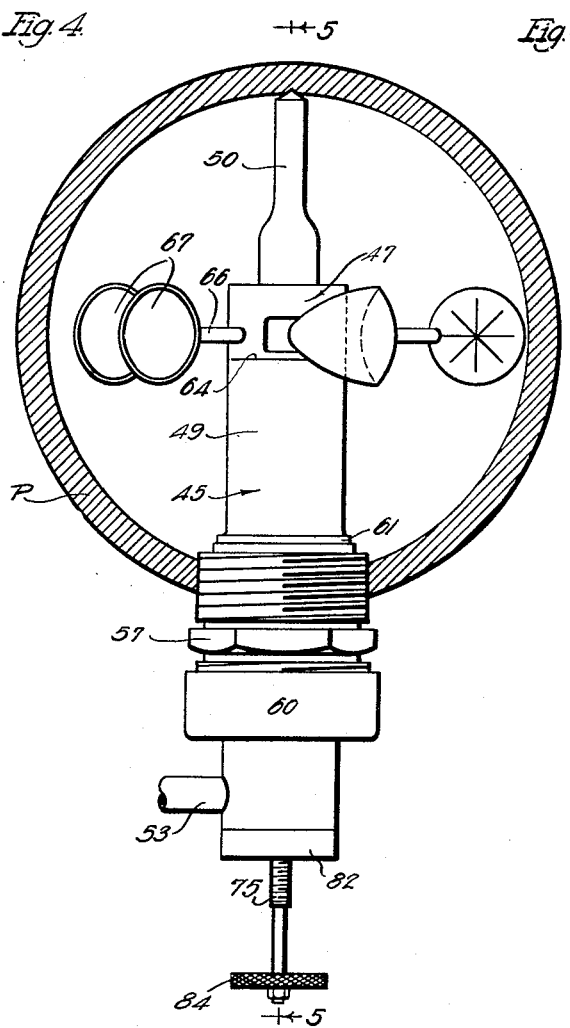
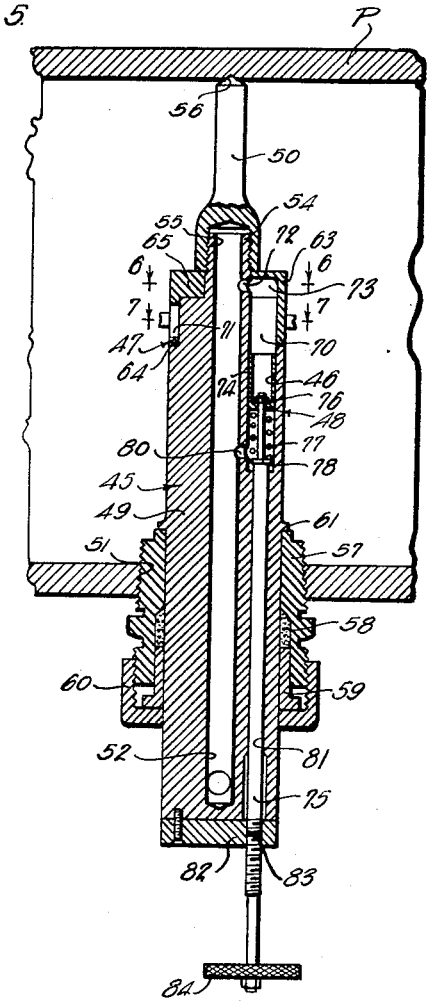
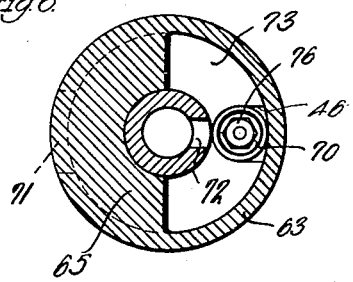
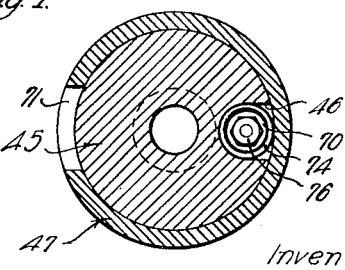
Inventors
WALLACE C. NIDEVER
and
EARL ARMBRUSTER
Their Attorney Patented June 26, 1934

1,964,270

UNITED STATES PATENT OFFICE 1,964,270

MEANS FOR SAMPLING LIQUIDS

Wallace C. Nidever and Earl Armbruster, Long Beach, Calif.

Application December 12, 1930, Serial No. 501,863

12 Claims. (Cl. 73—21)

This invention relates to means for sampling liquids; and it is a general object of the invention to provide an apparatus whereby a portion or sample of liquid may be obtained from a flowing or moving body of liquid that is truly representative of the entire body of liquid handled or sampled.

It is often desirable to take a sample of a body of liquid to determine its character or quality. Liquids such as oil, etc., are sampled to ascertain their water content and their various other properties. Devices commonly termed "thieves" are employed to take samples of standing bodies of liquid, for example, liquid stored in tanks, reservoirs, etc. Due to the tendency of standing bodies of liquid to stratify, so that they are not homogeneous throughout their depths, it has been found necessary to take samples, by means of thieves, or the like, at various depths in the liquid and then attempt to determine the properties of the entire bodies of liquid by means of the several samples thus obtained. It will be apparent that it is very difficult, if not impossible, to obtain a truly representative sample, or to obtain an accurate knowledge of the average character, of the liquid in the manner outlined above.

The present invention provides means for sampling moving or flowing bodies of liquid; and it is an object of the invention to provide a practical and effective manner and apparatus for sampling flowing liquids.

It is an object of the invention to provide an apparatus for sampling liquids whereby a truly representative or accurate sample may be obtained from a given quantity of moving or flowing liquid.

It is another object of the invention to provide an apparatus for sampling flowing liquid that may be effectively employed to obtain samples of liquid being passed into or from tanks, reservoirs, or other liquid-containing devices.

It is another object of the invention to provide a means for obtaining samples from flowing liquids whereby samples are obtained in accurate or direct proportion to the volume and rate of flow of the fluid.

It is another object of the invention to provide a liquid sampling device for sampling flowing liquid whereby a definite quantity of liquid is taken or obtained for each given number of cubic feet of the liquid being sampled.

It is another object of the invention to provide a device of the character mentioned that is particularly adapted to be mounted in a pipe line or conduit for discharging fluid into or from a liquid-containing tank, reservoir, or the like. The sampling device provided by the present invention is well suited for taking samples of liquid being delivered or discharged from a source of supply or being received in a tank, tank car, reservoir, or the like.

It is another object of the invention to provide a device for obtaining samples from flowing liquid that is entirely automatic in its operation and does not require manual or power actuating means.

It is another object of the invention to provide a device of the character mentioned for sampling flowing liquid that is adjustable to obtain samples of various quantities for any given number of cubic feet of liquid being handled.

Another object of the invention is to provide a liquid sampling device of the character mentioned that may be readily mounted in a pipe line without special fittings, connections, etc., and that may be readily reversed to obtain samples of liquid flowing in either direction through the line.

It is another object of the invention to provide a device in the nature of an automatic valve that is operable to divert a comparatively small amount or portion of liquid from a conduit or pipe line and to provide a device of this character that has a very wide range of use or application.

Other objects and features of our invention will be best and more fully understood from the following detailed description of typical forms and applications of the invention, throughout which description reference will be had to the accompanying drawings, in which:

Fig. 1 is a side elevation of one form of the invention, illustrating it in operative position in a pipe or conduit. Fig. 2 is a longitudinal detailed sectional view taken as indicated by line 2—2 on Fig. 1. Fig. 3 is a transverse view, taken as indicated by line 3—3 on Fig. 1 showing the central portions in cross section. Fig. 4 is a side elevation of another embodiment of the invention. Fig. 5 is a longitudinal detailed sectional view taken as indicated by line 5—5 on Fig. 4. Fig. 6 is an enlarged transverse detailed sectional view taken as indicated by line 6—6 on Fig. 5, and Fig. 7 is an enlarged transverse detailed sectional view taken as indicated by line 7—7 on Fig. 5.

The present invention provides a simple embodiment that is suitable for general use and that is operable to take or divert a comparatively small portion of liquid from a pipe line, and an embodiment that is particularly suited for use in sampling flowing liquid whose viscosity may vary and which may be under varying pressures, that is operable to obtain a definite quantity of liquid for each given number of cubic feet of liquid being passed or handled.

It will be apparent that the invention will be embodied in forms for use in various situations, for example, for use in different types and sizes of liquid conduits, or pipe lines, passages, flumes, etc.. and for handling various classes of liquids. The invention therefore is not to be taken as restricted to the particular forms or embodiments about to be described, but is to be taken as including any features or modifications that may fall within the scope of the claims.

The form of the invention illustrated in Figs. 1 to 3 includes, generally, a tubular shaft or body 10 adapted to be arranged in a pipe line or conduit C, a rotor 11 mounted on the body 10 within the conduit C adapted to be rotated by liquid flowing through the conduit, and valve means 12 for passing or diverting a portion or sample of liquid from the conduit C upon each revolution of the rotor 11.

The shaft or body 10 is provided to carry the rotor 11 and the valve means 12, and is adapted to pass or divert the samples from the conduit C. The body 10 is an elongated member having its inner end arranged transversely or diametrically through the conduit C and having its outer end projecting from the conduit. In the form of the invention illustrated, the body 10 is sectional, including an inner end section 13 and a main section 14. The inner end section 13 of the body acts to support or mount the body on the inner wall of the conduit C and includes a stem 15. The stem 15 may have its end beveled or pointed to seat in a beveled socket 16 in the inner wall of the conduit C. The opposite end of the stem 15 may be enlarged and provided with a screw-threaded socket 17.

The main section 14 of the body 10 is an elongated tubular member having its inner end attached to the end section 13. The inner end of the section 14 may be screw-threaded into the socket 17, and the section 14 may extend outwardly from the section 13 to project through an opening 18 in the wall of the conduit C. The section 14 may be cylindrical and means may be provided in the opening 18 for sealing around the body section 14. In the case illustrated, a gland is arranged in the opening 18 to seal around the body section 14. The gland may include a tubular box 19, screw-threaded in the opening 18. The box 19 carries packing 20 for sealing with the body section 14, and a compression sleeve 21 slidable on the outer portion of the box 19 to compress the packing 20. A nut 22 may be screw-threaded on the box 19 to retain the compression sleeve 21 in pressural engagement with the packing 20. An annular flange 23 may be provided on the body section 14 to engage the inner end of the box 19 to hold the body 10 against outward displacement.

The box 19 may be threaded into the opening 18 to clamp against the flange 23 and releasably set the body in any desired rotative position. The body section 14 projects outwardly from the nut 22 of the gland, and a T fitting 24 may be provided on its outer end. The outer arm of the fitting 24 may be closed by a gland 25, as will be hereinafter described. The lateral arm of the fitting 24 may discharge into a discharge conduit or pipe 26.

The rotor 11 is provided to control the operation of the valve means 12 and operates in conjunction with the valve means to cause a small portion or sample of liquid to be passed into the body 10 for each given quantity or number of cubic feet of liquid passing through the conduit C. The rotor 11 is rotatably mounted on the body 10 within the conduit C and is adapted to be operated by liquid flowing through the conduit. In accordance with the invention, the rotor 11 includes a hub 27 rotatable on the main section 14 of the body. The hub 27 is preferably mounted in a position where its central transverse axis is in a plane which intersects the central longitudinal axis of the conduit C. In the particular construction illustrated in the drawings, the hub 27 is rotatably mounted on the main section 14 between the inner end of the section 13 and an annular flange 28 on the section 14. Means is provided on the hub 11 for causing the fluid flowing through the conduit to rotate it. A plurality of circumferentially spaced radial arms 30 project outwardly from the hub 27. Buckets 31 are mounted on the outer ends of the arms 30. The buckets 31 are adapted to be acted on by the flowing liquid, and in accordance with the invention all face in the same direction.

The valve means 12 acts to divert or pass a portion of liquid into the opening 32 of the body 10 upon each revolution of the rotor 11. The valve means 12 contemplates a port 33 in the wall of the main section 14. The port 33 is within or normally closed by the hub 27. During operation of the device, the port 33 faces the flow of fluid through the conduit C, and, in the preferred form of the invention, is in alignment with the central longitudinal axis of the conduit. A port 34 is provided in the hub 27 to co-operate with or register with the port 33. The port 34 is in circumferential alignment with the port 33 and is brought into register with the port 33 upon each revolution of the rotor 11.

It will be apparent that a small portion or sample of fluid will be passed into the opening 32 of the body when the port 34 comes into register with the port 33. It is to be noted that the rate of flow of liquid through the conduit determines the number of samples obtained as the rate of rotation of the rotor 11 is in direct proportion to the rate of flow of liquid through the conduit. Further, the size of the samples obtained upon each revolution of the rotor 11 is governed by the pressure on the liquid passing through the conduit C.

In accordance with the invention, the valve means 12 includes means for varying or regulating the amount of liquid passed through the port 33 upon each rotation of the rotor 11. A regulator or valve member 35 is arranged in the opening 32 of the body 10, and is adjustable to close or partially close the port 33. The valve member 35 is cylindrical and is rotatably mounted within the opening 32. The member 35 is arranged in the opening 32 at a point within the hub 27 and is arranged between a shoulder 36 and a plug 37 closing the lower end of the opening 32. The outer end of the valve member 35 is open, and a lateral port 38 is provided in the wall of the member. The port 38 is in circumferential alignment with the port 33, and the member 35 may be rotated to bring the port 38 into and out of register with the port 33.

An adjusting stem 39 is provided for setting the valve member 35 in different rotative positions. The stem 39 is attached to the inner end of the valve member 35 and extends outwardly through the gland 25. The gland 25 seals around the stem 39 and guides the stem. An operating wheel or handle 40 may be provided on the outer projecting end of the stem 39. It will be apparent how the valve member 35 may be adjusted to various positions where the port 38 is fully or partially in register with the port 33, or is out of register with the port so that the valve member closes the port 33.

During operation of the form of the invention illustrated in Figs. 1 to 3 of the drawings, the liquid flowing through the conduit acts upon the buckets 31 to cause rotation of the rotor 11. The port 34 passes over or is brought into register with the port 33 during each revolution of the rotor 11. When the port 34 comes into register with the port 33, liquid is passed into the opening 32. The small portion or sample of liquid thus passed into the opening 32 may discharge outwardly through the pipe 26. The amount of sample taken upon each revolution of the rotor 11 may be varied by turning the member 35 to different rotative positions. In the event that the direction of flow of liquid through the conduit C is reversed, the body 10 may be turned 180° so that the port 33 faces the changed direction of flow. The pointed end of the body section 13 is rotatable in the socket 16, and the body 10 may be readily turned within the packing gland in the opening 18 to position the body as desired.

The form of the invention illustrated in Figs. 4 to 7 of the drawings is operable to take a sample or divert a definite volume of liquid from a conduit for each given volume of liquid passed through the conduit. When a standing body of liquid, for example, liquid contained in a tank, is to be discharged through a conduit, the viscosity of the liquid flowing through the conduit will vary as the level in the tank is lowered. Further, the viscosity of liquids usually varies with the temperature. When a sample is to be taken from a body of flowing liquid whose viscosity varies, it is very desirable to obtain a sample of a definite volume for each unit or volume of liquid passing through a conduit. The form of the invention illustrated in Figs. 4 to 7 is operable to obtain a sample of a definite volume for each number of cubic feet of liquid passed by a conduit, and is accordingly particularly well suited for sampling a volume of liquid whose viscosity varies or that is handled or passed at varying pressures and/or temperatures. It will be apparent that the embodiment of the invention illustrated in Figs. 4 to 7 may also be employed for sampling a liquid under constant pressure and temperature and of uniform viscosity.

The form of the invention illustrated in Figs. 4 to 7 of the drawings includes, generally, a body 45 to extend into a conduit P and having a chamber 46, means 47 operable by a flow of fluid through the conduit P to pass liquid into the chamber 46 from the conduit P and then to discharge it from the chamber 46, and means 48 for varying the capacity of the chamber 46 and for compensating for fluid pressures in the chamber.

The body 45 is an elongated structure and may be sectional, consisting of a main section 49 and an end section 50. The main section 49 of the body extends into the conduit P through an opening 51 in the wall of the conduit. The body section 45 is elongated and is provided with a central longitudinal fluid passage 52. The fluid passage 52 extends outwardly from the inner end of the section 49 to a point adjacent its outer end where it discharges into a lateral discharge pipe 53. A reduced end section 54 is provided on the inner end of the body section 49. The end section 50 of the body is provided with a screw-threaded socket 55 receiving the end of the section 54. The outer end of the body section 50 may be pointed to rotatably seat in a socket 56 in the wall of the conduit P. The body 45 is preferably arranged diametrically of the pipe or conduit P, and the section 45 projects outwardly from the conduit. A suitable packing gland may be arranged in the opening 51 to seal around the body section 49. The packing gland may consist of a tubular box 57 screw-threaded in the opening 51 and carrying packing 58. A slidable compression sleeve 59 may extend into the box 57 for compressing the packing 58. A nut 60 is threaded on the box 57 for retaining the compression sleeve 59 in position. The body 45 may be held against outward movement or displacement by a flange 61 on the section 45 engaging the inner end of the box 57. The box 57 may be threaded against the flange 61 to hold the body against rotative movement.

The chamber 46 for receiving or trapping fluid upon actuation of the means 47 is provided in the inner end part of the body section 49. The chamber 46 is preferably an elongated chamber of substantially round cross section having a central longitudinal axis parallel with the fluid passage 52. The chamber 46 extends outwardly from the shoulder at the base of the reduced section 54 of the section 49.

The means 47 for trapping liquid in the chamber 46 and for discharging it into the body opening 52 includes a rotor, rotatable on the body 45. The rotor may be similar, generally, to the rotor 11 described above, i. e., it may consist of a hub 63 rotatably mounted on the body 45 and means on the hub for causing its rotation by the liquid flowing through the conduit P. The central part or hub 63 of the rotor acts as a rotary valve, as will be hereinafter described, and is mounted on the inner end of the main body section 49. The hub 63 is a cylindrical tubular member rotatably mounted on the body section 49 between an annular inwardly facing shoulder 64 on the body and the end of the section 50. An inwardly extending radial flange 65 is provided on the hub 63 and operates between the shoulder 61 and the end of the section 50. The inner walls of the flange 65 may be rotatable on the reduced section portion 54.

The means for rotating the rotor may include a plurality of circumferentially spaced radial arms 66 projecting outwardly from the hub 63. The central longitudinal axes of the arms 66 are in a plane diametrically relative to the pipe or conduit P. A bucket 67 is provided on the outer end of each of the arms 66. The buckets 67 all face in the same direction and are acted upon by the liquid flowing through the conduit P to cause rotation of the rotor.

The valve means 47 contemplates a lateral port 70 extending from the chamber 46 to the exterior of the body section 49. The body 45 is positioned so that the port 70 faces the flow of liquid through the pipe P. In the particular case illustrated, the port 70 extends inwardly from the shoulder 64. The port 70 is within and normally closed by the hub 63. The port 71 is provided in the hub 63 to co-operate with or register with the port 70. The port 71 is in circumferential alignment with the port 70 and may be elongated circumferentially of the hub, as illustrated in Fig. 7 of the drawings. It will be apparent that the rotation of the hub 63 will move the port 71 into and out of register with the port 70 to admit liquid into the chamber 46 from the conduit P.

A port 72 is provided in the wall of the reduced section portion 54 of the body. The port 72 is within and is adapted to be closed by the inner walls of the radial flange 65 of the rotor hub. A port 73 is provided in the flange 65 and is adapted to register with the lower end of the chamber 46 and the port 72. The center of the port 73 is diametrically opposite the longitudinal center of the port 71. In accordance with the invention, the port 73 is of considerable length circumferentially of the hub. In the case illustrated, the port 73 extends about 180° around or through the flange 65. When in operation, the rotor 63 is rotated by the liquid flowing through the conduit P and, upon each rotation of the rotor, the port 71 is brought into register with the port 70 to pass liquid into the chamber 46. After the port 71 passes out of register with the port 70, the port 73 in the flange of the hub comes into register with the top of the chamber 46 and the port 72 so that liquid may pass from the chamber 46 into the passage 52 of the body. Liquid passed into the opening 52 may discharge through the pipe 53.

The means 48 operates to vary the capacity of the chamber 46. The means 48 includes a piston or plunger 74 slidable in the outer end part of the chamber 46. The plunger 74 is slidably carried on the reduced end of a rod or stem 75. A nut 76 may be provided on the end of the rod 75 to prevent displacement of the plunger 74. A helical spring 77 is arranged under compression between the plunger 74 and a flange 78 on the stem 75 to normally urge the plunger inwardly in the chamber 46. The piston is forced outwardly against the action of the spring 77 by the liquid under pressure passed into the chamber 46 through the port 70; and, upon the port 73 coming into register with the top of the chamber, the spring 77 aids in forcing the trapped liquid out of the chamber. It will be apparent that the pressure of the liquid passing through the conduit acts to vary the capacity of the chamber in the body so that a greater volume of liquid is trapped in the chamber when the liquid is under greater pressures.

A port 80 communicates between the body opening 52 and the portion of the chamber 46 behind the piston or means 48. The port 80 permits the piston to move when acted upon by the pressure of the fluid in the conduit by communicating with the passage 52 which is at atmospheric pressure, being open at 53 at all times.

In accordance with the invention, the plunger or piston 74 may be adjusted to various positions within the chamber 46 to vary the quantity of the sample taken upon each rotation of the rotor hub 63. The stem or rod 75 extends outwardly through an opening 81 in the body 45 and projects from the outer end of the body. A head 82 may be mounted on the outer end of the body section 49. A threaded opening 83 may be provided in the head 82 to co-operate with or pass a threaded part on the stem 75. A suitable hand wheel 84 may be provided on the outer end of the rod 75. It will be apparent how the rod 75 may be threaded inwardly or outwardly to adjust the piston 74 within the chamber 46 as desired.

During the operation of the form of the invention illustrated in Figs. 4 to 7, the ports 71 and 73 are alternately brought into communication with the chamber 46 so that liquid is trapped in the chamber and then permitted to discharge into the opening 52. When the port 71 comes into register with the port 70, the liquid enters the chamber 46 and acts outwardly on the plunger 74. After the port 71 passes the port 70, the port 73 comes into communication with the top of the chamber 46 so that the liquid may pass outwardly through the port 72 into the body opening 52. During the discharge of the liquid from the chamber, the spring 77 aids in forcing the liquid into the fluid passage 52. It will be apparent that this form of the invention is adapted to obtain a portion or sample of liquid of a definite volume for each volume of liquid passed through the conduit P. The means 48 operates to compensate for varying viscosity and pressure on the liquid flowing through the conduit, so that an aggregate sample is obtained that is truly representative of the entire body of liquid passed through the conduit P. The sample or portion obtained from the several volumes of liquid trapped within the chamber 46 form an average or aggregate sample of the liquid passed through the conduit that has the same characteristics or properties in the same proportion as the main body or portion of fluid.

It is to be noted that the present invention provides means for sampling fluid whereby an accurate sample may be obtained from a volume of liquid discharged or passed through a pipe line, or the like. The devices described above are simple in construction and may easily and quickly be arranged in operating position in pipe lines of various characters. The devices do not materially interfere with the free flow of liquid through the conduit and do not require manual operation. The devices may be adjusted to obtain large or small portions or samples, as desired.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. A liquid sampling device including, a body having a fluid passage, a rotor rotatable on the exterior of the body, and means on the rotor for causing flowing fluid to rotate it, there being a port in the body communicating with said passage and normally closed by the rotor, and a port in the rotor to communicate with the first-mentioned port once during each revolution of the rotor.

2. A liquid sampling device including, a body to extend into flowing liquid and having a liquid passage and a port communicating therewith, an element surrounding the body and adapted to be rotated by the liquid, and means for passing a portion of liquid through said port and into the said passage upon each revolution of the element, said means including a part on the element having a port adapted to register with the port in the body.

3. A device for sampling liquid flowing through a conduit which includes, a body to extend into the conduit having a passage discharging at the exterior of the conduit and having a port communicating with the passage, a rotor surrounding the body within the conduit and adapted to be rotated by the liquid, and valve means on the rotor for passing a portion of liquid into the said port to flow out of the passage upon revolution of the rotor.

4. A device for sampling liquid flowing through a conduit which includes, a body to extend into the conduit having a port and a passage communicating therewith and discharging at the exterior of the conduit, a rotor surrounding the body within the conduit and adapted to be rotated by the liquid, and adjustable valve means for passing a portion of liquid into the said passage upon rotation of the rotor including a port in the rotor to register with the port in the body, and a valve in the body to control the port in the body.

5. A device for sampling liquid flowing through a conduit which includes, a body to extend into the conduit having a passage discharging at the exterior of the conduit and having a lateral port communicating with the passage, means for rotatably mounting the body in the conduit so that it may be positioned with the port facing either direction longitudinally of the conduit, and means operable by the flow of liquid for passing a sample of liquid through said port.

6. A device for sampling liquid flowing through a conduit which includes, a body to extend into the conduit having a passage discharging at the exterior of the conduit, a rotor rotatable on the exterior of the body within the conduit and adapted to be rotated by the liquid, and adjustable valve means for passing a portion of liquid into the said passage upon each rotation of the rotor, including a part on the rotor having a port adapted to register with a port in the body, and a member in the body for controlling the passage of liquid through the port in the body.

7. A device for sampling liquid flowing through a conduit which includes, a body to extend into the conduit having a passage discharging at the exterior of the conduit, a rotor rotatable on the exterior of the body within the conduit and adapted to be rotated by the liquid, and adjustable valve means for passing a portion of liquid into the said passage upon each rotation of the rotor, including a part on the rotor having a port adapted to register with a port in the body, a member in the body for controlling the passage of liquid through the body part, and means for operating the said member.

8. A liquid sampling device for use on a tube having a lateral opening in its wall, said device including, a body extending through said opening into the tube and having a liquid passage, a port communicating with the passage, and a chamber, and means operable by the flow of liquid through the tube for trapping liquid in the chamber and then passing it into the passage including, a rotor on the body within the tube and including a hub rotatable on the body adapted to be rotated by the liquid flowing through the tube, said rotor normally closing the chamber and said port, there being a port in the hub adapted to admit liquid from the tube to the chamber and a port in the hub to put the chamber in communication with the port in the body.

9. A liquid sampling device for use on a tube having a lateral opening in its wall, said device including, a body extending through said opening into the tube and having a liquid passage, a port communicating with the passage, and a chamber, and means operable by the flow of liquid through the tube for trapping liquid in the chamber and then passing it into the passage including, a rotor on the body rotatable by the flowing liquid, the rotor normally closing the chamber and said port, there being a port in the rotor for passing liquid from the tube into the chamber and there being a port in the rotor for passing liquid from the chamber into the port in the body, the ports in the rotor being circumferentially spaced.

10. A device for sampling liquid flowing through a conduit which includes, a body to extend into the conduit and having a liquid passage and a chamber adapted to communicate with the passage, means operable by the flow of liquid in the conduit for trapping liquid in the chamber and for then passing it from the chamber into the passage including a rotor rotatable on the body by the flowing liquid and normally closing the chamber to the conduit and passage, there being a port in the rotor to pass liquid from the conduit to the chamber and a port in the rotor to pass liquid from the chamber into the passage, and means for varying the capacity of the chamber, including a plunger slidable in the cylinder, and means yieldingly resisting movement of the plunger at all times.

11. A sampling device of the character described including, a body adapted to be applied to a conduit to project therein, the body having a liquid passage to discharge at the exterior of the conduit, a chamber spaced from the passage and a lateral port communicating with the passage, and a rotor mounted on the body to be rotated by the flow of liquid through the conduit, the chamber having an open end normally closed by the rotor, the rotor having a port to come into communication with the open end of the chamber once during each rotation of the rotor to pass liquid from the conduit into the chamber and a a port to come into register with the open end of the chamber and the port in the body to pass liquid from the chamber to the passage.

12. A sampling device of the character described including, a body adapted to be applied to a conduit to project therein, the body having a liquid passage to discharge at the exterior of the conduit and a lateral port communicating with the passage, a rotor surrounding the body and operable by the flow of liquid through the conduit, there being a port in the rotor to pass liquid from the conduit to the said lateral port, a valve member in the passage to control the flow of liquid through said lateral port, and means operable from the exterior of the conduit to actuate the valve member.

WALLACE C. NIDEVER.
EARL ARMBRUSTER.